United States Patent
Srour

(10) Patent No.: US 10,724,280 B1
(45) Date of Patent: Jul. 28, 2020

(54) DOUBLE LIVING HINGE COLLAPSIBLE DISCS

(71) Applicant: Ikey Srour, Brooklyn, NY (US)

(72) Inventor: Ikey Srour, Brooklyn, NY (US)

(73) Assignee: QUEST USA CORP., Brooklyn, NJ (US)

(*) Notice: Subject to any disclaimer, the term of this patent is extended or adjusted under 35 U.S.C. 154(b) by 0 days.

(21) Appl. No.: 16/354,459

(22) Filed: Mar. 15, 2019

(51) Int. Cl.
| | |
|---|---|
| *E05D 3/02* | (2006.01) |
| *A45F 3/20* | (2006.01) |
| *B65D 21/08* | (2006.01) |
| *F16M 11/10* | (2006.01) |
| *F16M 11/40* | (2006.01) |
| *F16M 11/06* | (2006.01) |

(52) U.S. Cl.
CPC .......... *E05D 3/02* (2013.01); *A45F 3/20* (2013.01); *B65D 21/086* (2013.01); *F16M 11/06* (2013.01); *F16M 11/10* (2013.01); *F16M 11/40* (2013.01)

(58) Field of Classification Search
CPC combination set(s) only.
See application file for complete search history.

(56) References Cited

U.S. PATENT DOCUMENTS

| | | | |
|---|---|---|---|
| 2,825,378 A | 3/1958 | Vaca | |
| 3,773,203 A | 11/1973 | Grimaldi et al. | |
| 4,760,866 A | 8/1988 | Adler | |
| 4,946,061 A * | 8/1990 | Hobbs | B65D 17/506 215/301 |
| D314,865 S | 2/1991 | Tuisku | |
| D327,808 S | 7/1992 | Kline | |
| D330,632 S | 11/1992 | Hensley | |
| D332,347 S | 1/1993 | Raadt et al. | |
| D352,896 S | 11/1994 | Jones | |
| D404,762 S | 1/1999 | Vogel | |
| 5,944,080 A | 8/1999 | Odwika | |
| D446,647 S | 8/2001 | Protheroe | |
| D446,648 S | 8/2001 | Protheroe | |
| D447,868 S | 9/2001 | Protheroe | |
| D470,657 S | 2/2003 | Kawamura | |
| D471,008 S | 3/2003 | Dubone | |
| D475,696 S | 6/2003 | Hussaini et al. | |
| D481,537 S | 11/2003 | Vaughn | |
| D489,051 S | 4/2004 | Shiraki et al. | |
| 6,736,285 B2 | 5/2004 | Steward-Stand | |
| D492,944 S | 7/2004 | Drakoulis et al. | |
| D509,955 S | 9/2005 | Williams | |
| D512,914 S | 12/2005 | Moretti | |

(Continued)

OTHER PUBLICATIONS

Fasttech.com. RFID Blocking Credit Card Holder Wallet Money Clip Case. Date listed Oct. 2017 [date retrieved Mar. 6, 2018]: https://www.fasttech.com/products/9343200.

*Primary Examiner* — Ganiyu A Hanidu
(74) *Attorney, Agent, or Firm* — Michael J. Feigin, Esq.; Feigin and Fridman LLC

(57) ABSTRACT

Two circular discs are collapsible towards each other and expandable away from each other by way of rotatable hinge(s) situated there-between which move the circular discs towards and away from each other. The rotatable hinge(s) are connected to the circular discs by way of living hinges. The rotable hinge(s) may be surrounded by a cloth or plastic cover which can be non-resilient or resilient, such a cover further connected in a circular manner to each disc.

17 Claims, 15 Drawing Sheets

(56) References Cited

U.S. PATENT DOCUMENTS

| | | |
|---|---|---|
| D516,577 S | 3/2006 | Matsuoka |
| D521,499 S | 5/2006 | Takita et al. |
| D525,612 S | 7/2006 | Densho |
| D527,898 S | 9/2006 | Tavone |
| D531,618 S | 11/2006 | Kennemer et al. |
| D536,614 S | 2/2007 | Peterson et al. |
| D547,062 S | 7/2007 | Chang |
| D560,116 S | 1/2008 | Brassard |
| D572,465 S | 7/2008 | Beck |
| D601,366 S | 10/2009 | Barabas et al. |
| D605,188 S | 12/2009 | Martinez |
| D610,798 S | 3/2010 | Silvera |
| D618,692 S | 6/2010 | Deutsch et al. |
| D619,559 S | 7/2010 | Voorhees |
| D622,958 S | 9/2010 | Moore |
| D626,935 S | 11/2010 | Ohtani et al. |
| D627,330 S | 11/2010 | Otsuka |
| D633,477 S | 3/2011 | Lorenzo |
| D633,644 S | 3/2011 | Sprengers |
| D637,583 S | 5/2011 | Beal et al. |
| 7,987,148 B2 | 7/2011 | Hangartner et al. |
| D647,881 S | 11/2011 | Warner |
| D647,892 S | 11/2011 | Ragde, Jr. |
| D650,371 S | 12/2011 | Wibby et al. |
| D652,825 S | 1/2012 | Bau |
| D652,836 S | 1/2012 | Voorhees |
| D654,054 S | 2/2012 | Kohte et al. |
| D655,692 S | 3/2012 | Silverman et al. |
| D656,135 S | 3/2012 | Swartz et al. |
| D656,926 S | 4/2012 | Jones, III et al. |
| D656,927 S | 4/2012 | Jones, III et al. |
| D656,928 S | 4/2012 | Jones, III et al. |
| D658,164 S | 4/2012 | Chan |
| D660,306 S | 5/2012 | Voorhees |
| 8,186,642 B2 | 5/2012 | Weiss-Vons |
| 8,317,046 B2 | 11/2012 | Vanderberg et al. |
| D675,197 S | 1/2013 | Losiewicz |
| D681,020 S | 4/2013 | Magness et al. |
| D681,612 S | 5/2013 | Palacios |
| D681,613 S | 5/2013 | Magness et al. |
| D689,479 S | 9/2013 | Soffer |
| D690,931 S | 10/2013 | Minn |
| D691,988 S | 10/2013 | Warner |
| 8,560,031 B2 | 10/2013 | Barnett et al. |
| D693,818 S | 11/2013 | Webber |
| D694,222 S | 11/2013 | Thompson et al. |
| D694,463 S | 11/2013 | Sieczkowski |
| 8,616,327 B1 | 12/2013 | Palacios |
| D699,757 S | 2/2014 | Wilkey |
| D703,647 S | 4/2014 | Kim |
| D703,949 S | 5/2014 | Chappell et al. |
| D705,199 S | 5/2014 | Huang et al. |
| D705,229 S | 5/2014 | Wengreen et al. |
| D705,764 S | 5/2014 | Thoni |
| D705,767 S | 5/2014 | Yoon |
| 8,737,066 B1 | 5/2014 | Block |
| D707,965 S | 7/2014 | Requa |
| D710,340 S | 8/2014 | Wengreen et al. |
| D714,126 S | 9/2014 | Pyon et al. |
| D715,784 S | 10/2014 | Lin et al. |
| D716,043 S | 10/2014 | Wilk |
| D717,780 S | 11/2014 | Tussy |
| D718,750 S | 12/2014 | Young et al. |
| D719,143 S | 12/2014 | Vidovic |
| D719,350 S | 12/2014 | Daoura |
| D721,373 S | 1/2015 | Logereau |
| D722,235 S | 2/2015 | Meng |
| D723,799 S | 3/2015 | Glass et al. |
| D724,841 S | 3/2015 | Schneider et al. |
| D726,234 S | 4/2015 | Needham |
| D728,230 S | 5/2015 | Oas |
| D728,535 S | 5/2015 | Degenkolb |
| D730,047 S | 5/2015 | Yi |
| D734,305 S | 7/2015 | Wengreen |
| D735,174 S | 7/2015 | Wengreen |
| D738,619 S | 9/2015 | Gluck |
| D738,872 S | 9/2015 | Erickson-Davis et al. |
| D739,389 S | 9/2015 | Prohaska |
| D743,409 S | 11/2015 | Chen |
| D745,014 S | 12/2015 | Vales |
| D745,274 S | 12/2015 | Minn et al. |
| D747,093 S | 1/2016 | Rogers |
| D748,615 S | 2/2016 | Lee et al. |
| D749,069 S | 2/2016 | Senoff |
| D749,549 S | 2/2016 | Wengreen |
| D751,289 S | 3/2016 | Gluck |
| D756,222 S | 5/2016 | Lopez et al. |
| D756,366 S | 5/2016 | Floersch et al. |
| D759,966 S | 6/2016 | Pignotti |
| D761,236 S | 7/2016 | Wengreen |
| D763,835 S | 8/2016 | Wengreen |
| D765,063 S | 8/2016 | Wengreen |
| D765,064 S | 8/2016 | Wengreen |
| D766,228 S | 9/2016 | Haymond |
| D768,382 S | 10/2016 | Wu |
| D768,383 S | 10/2016 | Wu |
| D769,859 S | 10/2016 | Herbst et al. |
| D772,212 S | 11/2016 | Poon et al. |
| D772,739 S | 11/2016 | Browning et al. |
| D772,882 S | 11/2016 | Paschke et al. |
| 9,486,910 B2 | 11/2016 | Stevens et al. |
| D773,325 S | 12/2016 | Browning et al. |
| D774,887 S | 12/2016 | Torrison et al. |
| D775,824 S | 1/2017 | King |
| D776,426 S | 1/2017 | Smith |
| D776,529 S | 1/2017 | Torrison et al. |
| D777,025 S | 1/2017 | Turksu et al. |
| D777,162 S | 1/2017 | Erickson-Davis |
| D778,884 S | 2/2017 | Taptic et al. |
| D779,466 S | 2/2017 | Wengreen |
| D780,449 S | 3/2017 | King |
| D781,832 S | 3/2017 | Snitko et al. |
| D783,593 S | 4/2017 | Chen |
| D784,811 S | 4/2017 | Scevola |
| D784,977 S | 4/2017 | Ormsbee et al. |
| D784,978 S | 4/2017 | Hobbs et al. |
| D789,076 S | 6/2017 | Pierre |
| D792,220 S | 7/2017 | Simons et al. |
| D794,007 S | 8/2017 | Zhang |
| D794,456 S | 8/2017 | Rockwell |
| D794,607 S | 8/2017 | Srour |
| D798,591 S | 10/2017 | King |
| D801,176 S | 10/2017 | Lynd et al. |
| 9,787,348 B2 | 10/2017 | Srour |
| D804,306 S | 12/2017 | Simons et al. |
| D806,386 S | 1/2018 | King |
| D807,746 S | 1/2018 | Fleming |
| D808,158 S | 1/2018 | King |
| D817,316 S | 5/2018 | Srour |
| 9,970,589 B2 | 5/2018 | Hobbs et al. |
| 2004/0145870 A1 | 7/2004 | Minami et al. |
| 2006/0283859 A1 | 12/2006 | Lu |
| 2011/0192857 A1 | 8/2011 | Rothbaum et al. |
| 2012/0042476 A1 | 2/2012 | Karmatz |
| 2012/0104185 A1 | 5/2012 | Carroll |
| 2012/0168483 A1 | 7/2012 | Jambunathan et al. |
| 2012/0279133 A1* | 11/2012 | Vullings ............... E05D 15/507 49/385 |
| 2012/0329534 A1* | 12/2012 | Barnett ................. F16M 11/10 455/575.8 |
| 2013/0001382 A1 | 1/2013 | Jang |
| 2013/0148271 A1 | 6/2013 | Huang |
| 2013/0277991 A1 | 10/2013 | Wu |
| 2014/0317329 A1 | 10/2014 | Barnett et al. |
| 2015/0077927 A1 | 3/2015 | Barnett et al. |
| 2015/0201743 A1 | 7/2015 | Erickson-Davis et al. |
| 2015/0288409 A1 | 10/2015 | Forsythe |
| 2015/0335138 A1 | 11/2015 | Juarbe |
| 2015/0365125 A1 | 12/2015 | Murphy et al. |
| 2016/0058162 A1 | 3/2016 | Wang et al. |
| 2017/0195000 A1* | 7/2017 | Srour ................... H04B 1/3888 |
| 2017/0293207 A1 | 10/2017 | Jeon |

(56) References Cited

U.S. PATENT DOCUMENTS

2018/0051846 A1* 2/2018 Hobbs ................ H01R 13/33
2018/0066791 A1   3/2018 Hobbs et al.

* cited by examiner

DOUBLE LIVING HINGE COLLAPSIBLE DISCS

FIELD OF THE DISCLOSED TECHNOLOGY

The disclosed technology relates to accessories with living hinges, and more specifically to expandable accessories.

SUMMARY OF THE DISCLOSED TECHNOLOGY

A collapsible device of embodiments of the disclosed technology has a rotating hinge with a top section and bottom section, a top circular disc connected via a living hinge to the top section of the rotating hinge, and a bottom circular disc connected via a second living hinge to the bottom section.

A "disc" is defined as "a device with a substantially circular most elongated plane thereof." The directions "top" and "bottom" are relative and interchangeable for purposes of this disclosure. In some embodiments, there is a horizontal line or plane of symmetry between the top and bottom halves of the device.

A "living hinge" is defined as "a flexure bearing which is flexible (changeable angle) and connects two rigid elements together in a way in which the rigid pieces can repeatedly (1000+ times) bend relative to one another and remain connected." Living hinges of embodiments of the disclosed technology are formed from thinned plastic material between disc and a part of a rotating hinge. In some embodiments, a disc, living hinge, and rotating hinge are formed together in a single mold. In some embodiments, two of such single molds are formed and a pin joins the rotating hinges together to form the collapsible device.

A "rotating hinge" is nomenclature used to differentiate from the "living hinge". A "rotating hinge" is a device or elements of a device which rotate relative to one another and around a pin which connects between the elements which rotate relative to one another. The portion of the elements which rotate around a pin is called the "frictional" section because in embodiments of the disclosed technology the top and bottom portion of the hinge which rotate around the pin. Friction hinders movement the top and bottom section relative to one another so that the device can rest in a stable configuration, whether expanded or contracted. An external expansion or contraction force is required, in embodiments of the disclosed technology, to expand or contract the hinges which moves the discs further or closer to each other.

The rotating hinge is adjustable between a first and second condition in embodiments of the disclosed technology. In a first condition, the top section and the bottom section of the rotating hinge are in parallel to one another and as are the longest length (largest plane) of each of the top circular disc and the bottom circular disc. In a second condition, the top section and the bottom section of the rotatable hinge are at acute angle to one another and the discs are further apart than in the collapsed condition.

An exterior cover surrounds the rotating hinge and prevents the top section and the bottom section from becoming inline with each other due to taut stretching of the exterior cover. "Taut stretching" is defined as "pulled to in a substantially maximum or maximum distance before breaking or becoming at least partially disconnected." The exterior cover folds uniformly in the first condition and expands with an alternating diagonal exterior in the second condition in one embodiment of the disclosed technology. In another embodiment, the cover is non-resilient and is connected to each of the top circular disc and the bottom circular disc.

The frictional pin and each living hinge cause the collapsible device in the second condition to remain in the second condition when the collapsible device is left to rest in an embodiment of the disclosed technology. In another or the same embodiment, the rotating hinge can be a plurality thereof rotating hinges. Such a plurality of rotating hinges are equidistant from a center point between the plurality of rotating hinges and are equi-spaced in a circular formation in embodiments of the disclosed technology. A "circular formation" is one where each hinge is around a circle from a center point, though the sides are flat thus it is not a true mathematical circle, but rather sides of a dis-joined regular polygon, such as a six sided polygon made of six different rotating hinge sections (top and/or bottom sections). The plurality of rotating hinges fold such that an acute angle between each respective top section and bottom section face away from the center point, or towards the center point, depending on the embodiment of the technology. The plurality of rotating hinges create an enclosed space therebetween in some embodiments (which is perceived as enclosed despite possible small spaces (less than 5 mm) opening therein the sides.

A sliding frictional mechanism extends between two of the plurality of rotating hinges and hinders movement of said top circular disc and the bottom circular disc relative to one another in an embodiment of the disclosed technology.

Any device or step to a method described in this disclosure can comprise or consist of that which it is a part of, or the parts which make up the device or step. The term "and/or" is inclusive of the items which it joins linguistically and each item by itself. "Substantially" is defined as "at least 95% of the term being described" and any device or aspect of a device or method described herein can be read as "comprising" or "consisting" thereof.

DETAILED DESCRIPTION OF EMBODIMENTS OF THE DISCLOSED TECHNOLOGY

Two circular discs are collapsible towards each other and expandable away from each other by way of rotatable hinge(s) situated there-between which move the circular discs towards and away from each other. The rotatable hinge(s) are connected to the circular discs by way of living hinges. The rotable hinge(s) may be surrounded by a cloth or plastic cover which can be non-resilient or resilient, such a cover further connected in a circular manner to each disc.

Embodiments of the disclosed technology will become more clear in view of the following description of the figures.

FIGS. 1-11 show an embodiment of a collapsible device with a cloth or flexible (non-resilient) cover. That is, the cover is unable to maintain a particular shape on it's own but for gravity or being held in a specific configuration by other items it is attached to such as resilient discs. "Resilient" is defined as "ordinarily maintains or is returnable to a shape under manual pressure" and "non-resilient" is defined as "ordinarily unable to maintain a shape under manual pressure."

Figure 1:
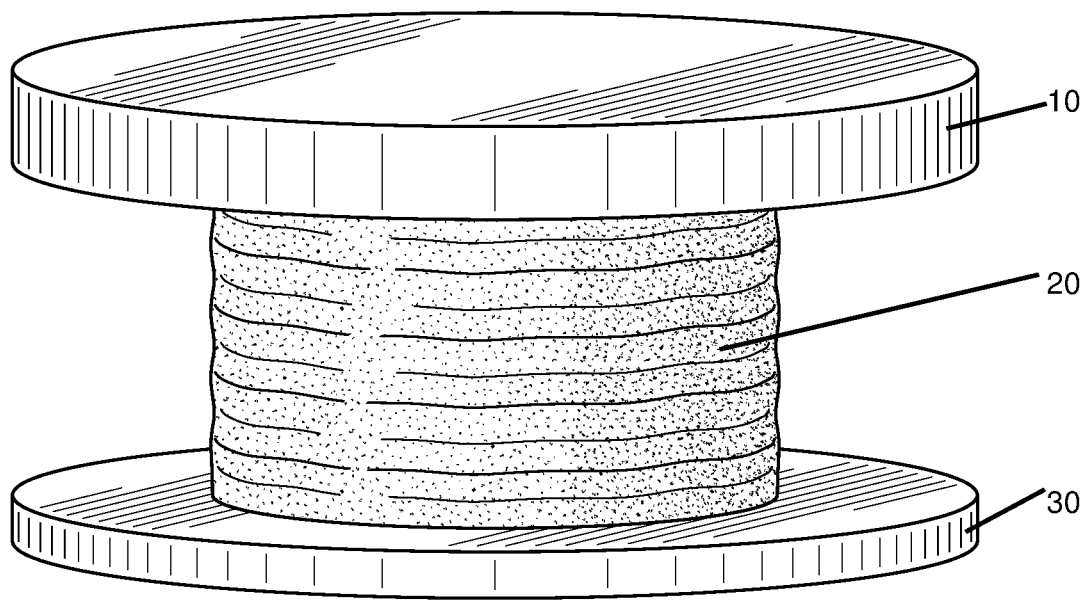
FIG. 1 shows a top and side elevation view of a collapsible device with a cloth or non-resilient covering in an embodiment of the disclosed technology.
Figure 2:
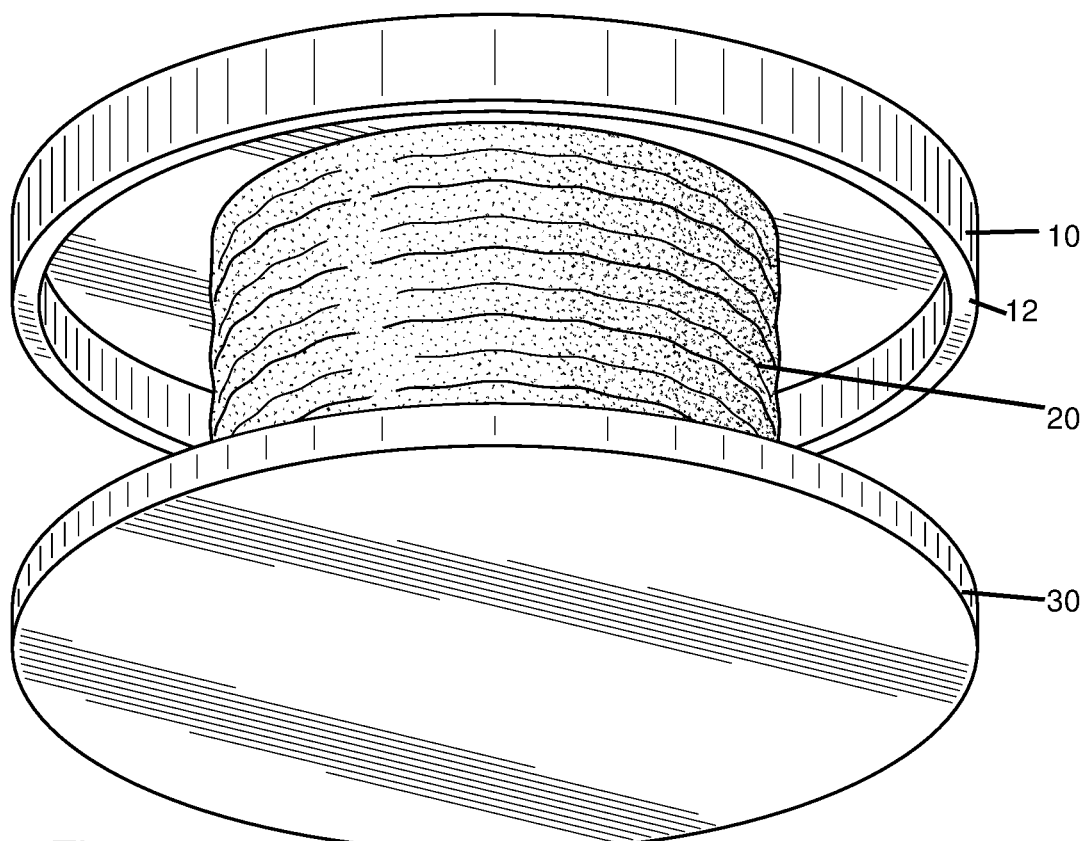
FIG. 2 shows a bottom and side elevation view of the collapsible device of FIG. 1.
Figure 3:
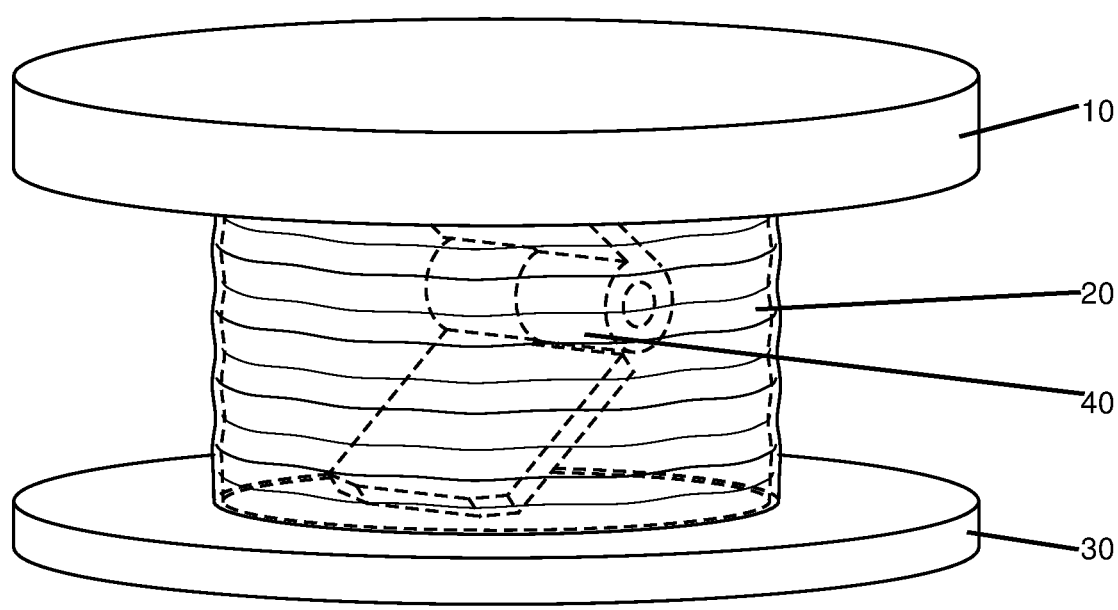
FIG. 3 shows a rotating hinge within the collapsible device of FIG. 1.
Figure 4:
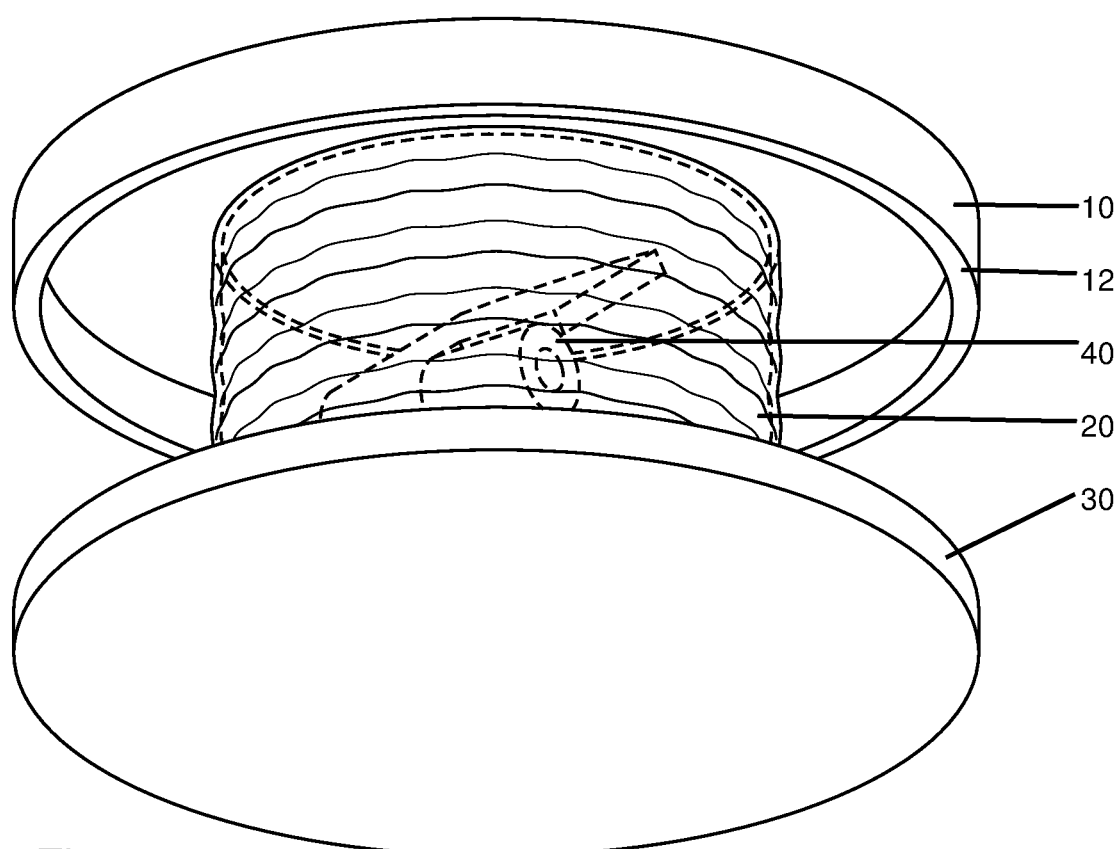
FIG. 4 shows a rotating hinge within the collapsible device of FIG. 2.
Figure 5:
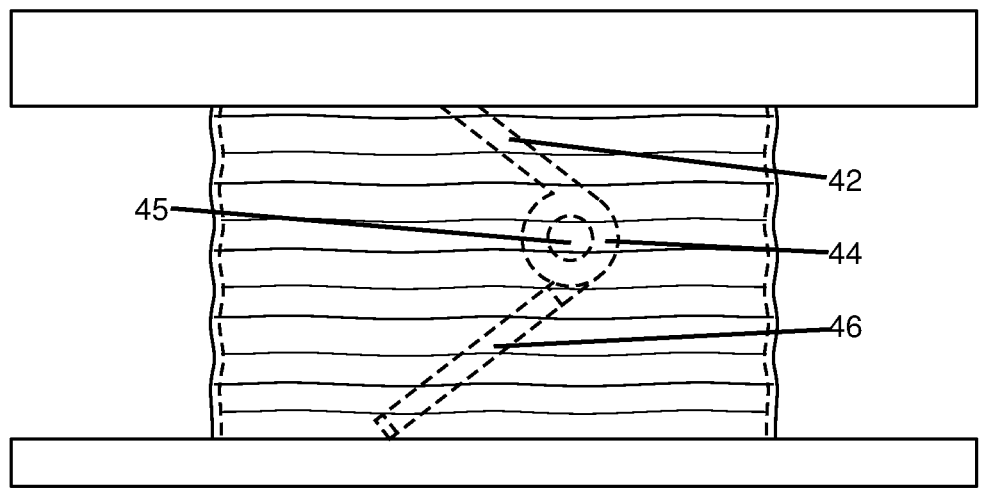
FIG. 5 shows a side elevation view of the collapsible device of FIG. 1.
Figure 6:
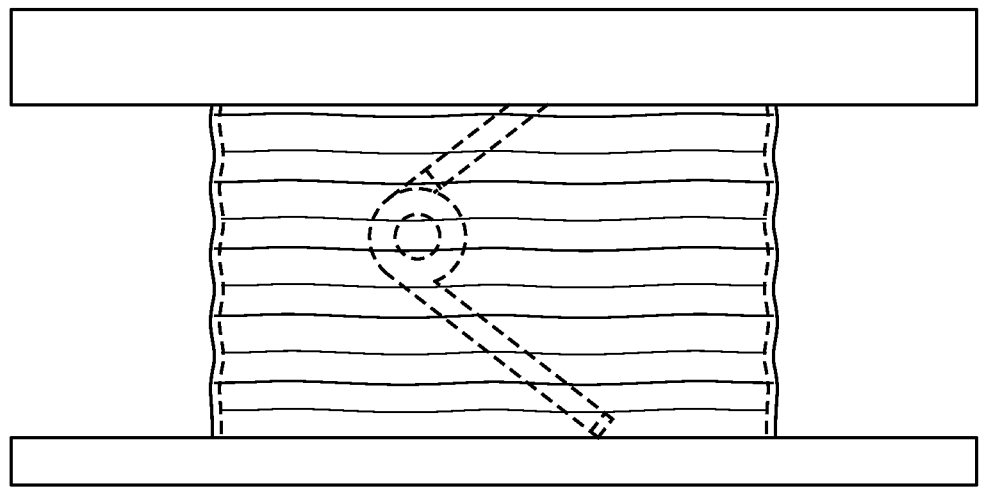
FIG. 6 shows a second side elevation view of the collapsible device of FIG. 1.
Figure 7:
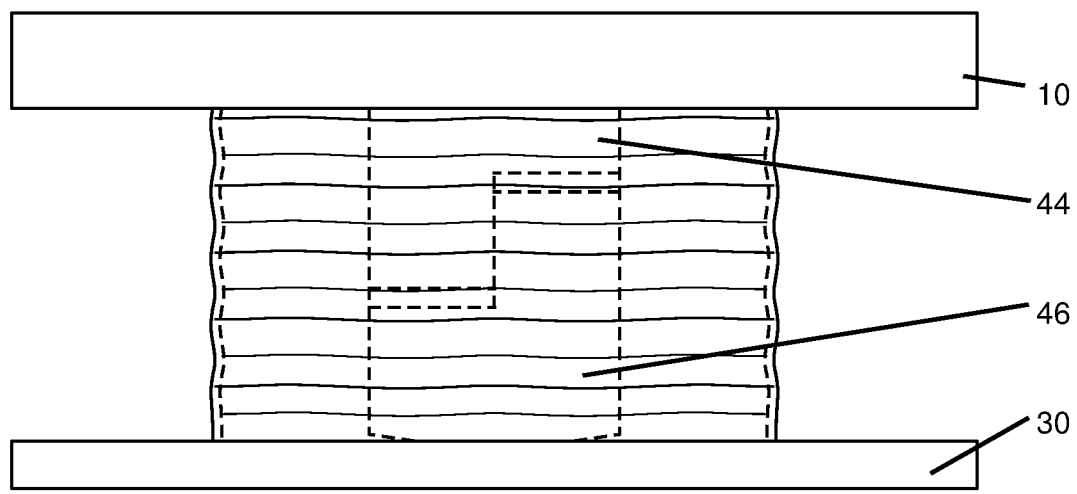
FIG. 7 shows a third side elevation view of the collapsible device of FIG. 1.
Figure 8:
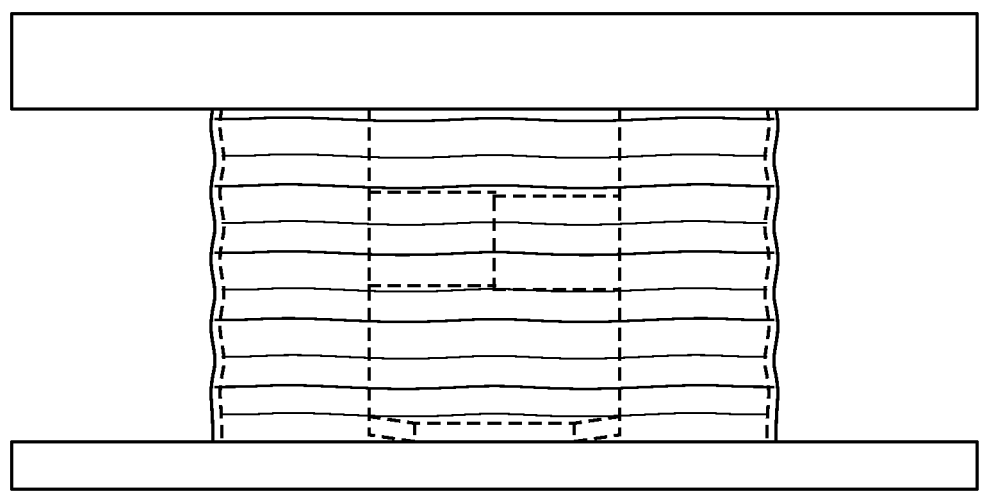
FIG. 8 shows a fourth side elevation view of the collapsible device of FIG. 1.

Discussing now FIGS. 1 and 8 simultaneously, perspective views are shown of the collapsible device with a cloth or other non-resilient cover are shown. A top and bottom disc 10 and 30 are spaced apart with the cover 20 connected there-between an enclosing a region inside the cloth and each cover. The covers can be identical or substantially identical where "substantially identical" is defined as having a same or substantially the same circular circumference of a most elongated or largest plane but having different depths and/or lips. For example, the top disc 10 can have a downward extending lip 12. That is, having different depths is still to be considered within the definition of "substantially" provided in the Summary of this disclosure.

In FIGS. 3 through 8, the cloth 20 is shown translucent so that the rotating hinge 40 which connects the top 10 and bottom 30 discs is viewable. The rotating hinge 40 has a top section 44 and bottom section 46 which are substantially identical or identical in embodiments of the disclosed technology. Each can be shaped with a larger planar portion which forms a unitary connection with a smaller cylindrical section. A pin 45 passes through a portal of each smaller cylindrical section 42 to connect the top (upper) section 44 and bottom (lower) section 46 to each other.

Figure 9:
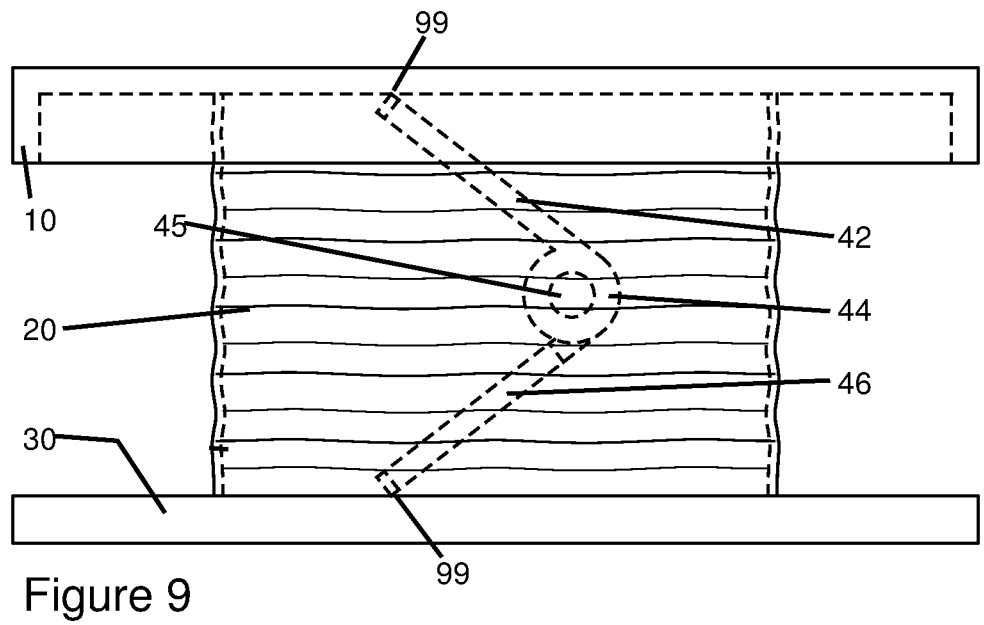
FIG. 9 shows a side elevation view of the collapsible device of FIG. 1 in an expanded configuration.
Figure 10:
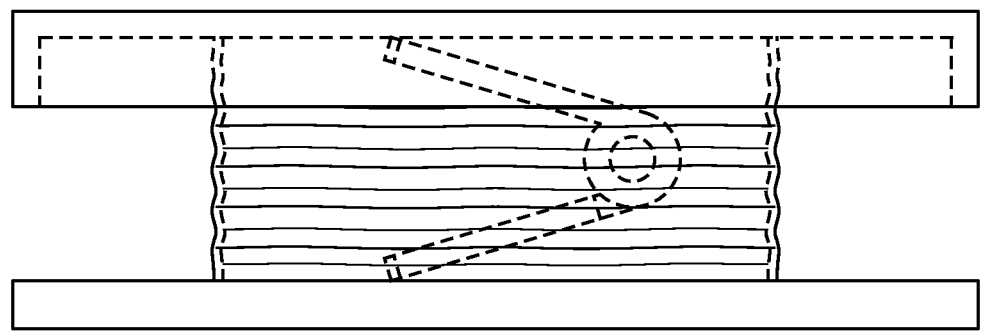
FIG. 10 shows a side elevation view of the collapsible device of FIG. 1 in a partially collapsed expanded configuration.
Figure 11:
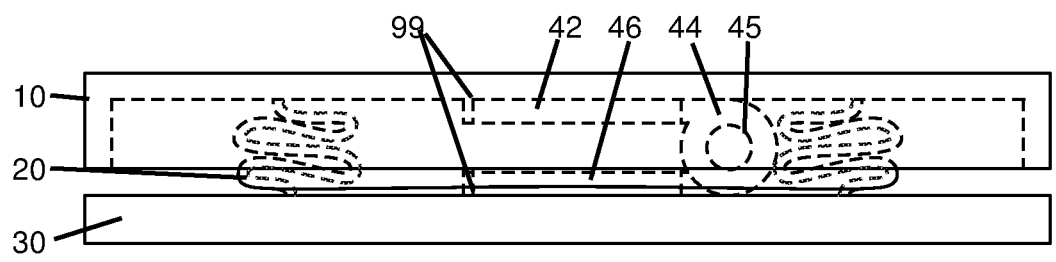
FIG. 11 shows a side elevation view of the collapsible device of FIG. 1 in a collapsed configuration.
Figure 12:
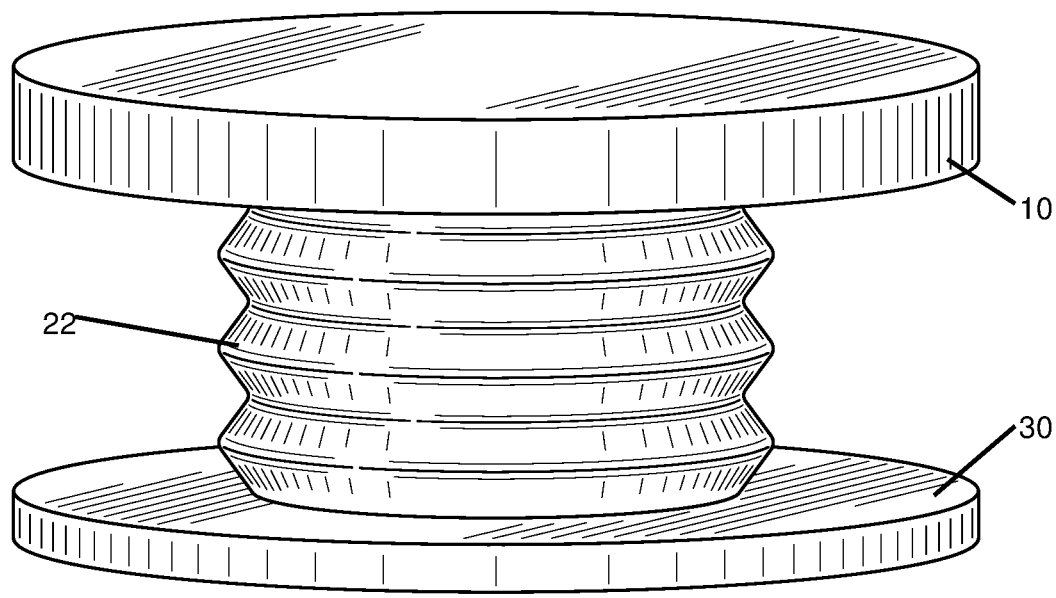
FIG. 12 shows a top and side elevation view of a collapsible device with a pliable plastic or resilient covering in an embodiment of the disclosed technology.
Figure 13:
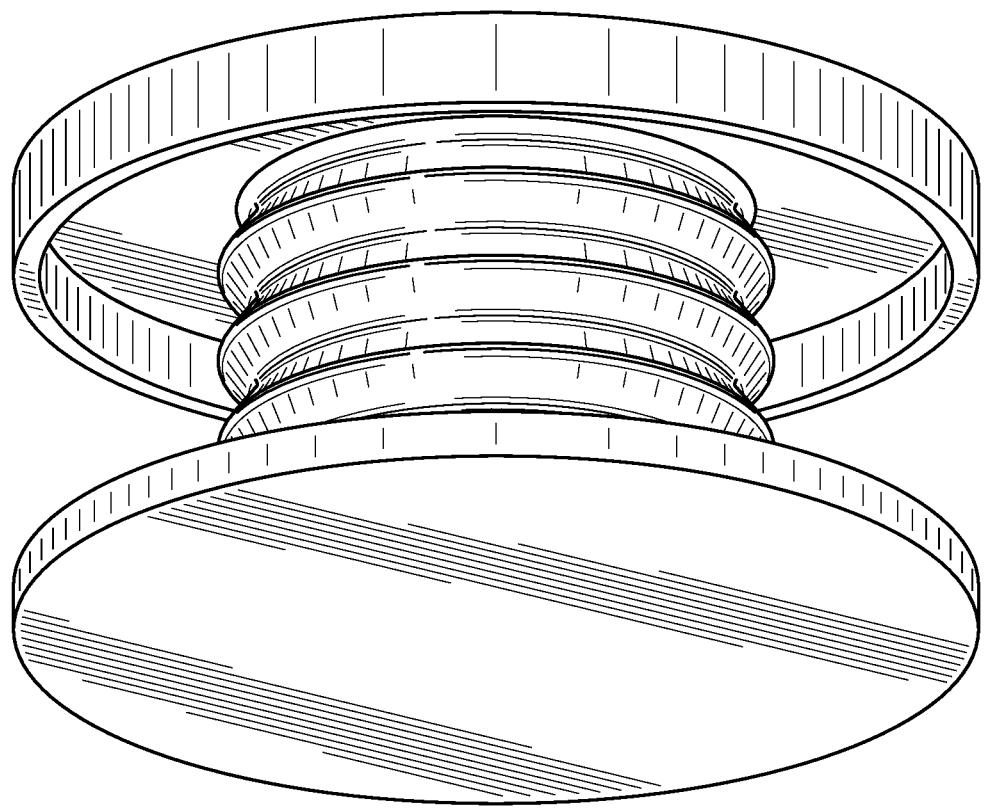
FIG. 13 shows a bottom and side elevation view of the collapsible device of FIG. 11.
Figure 14:
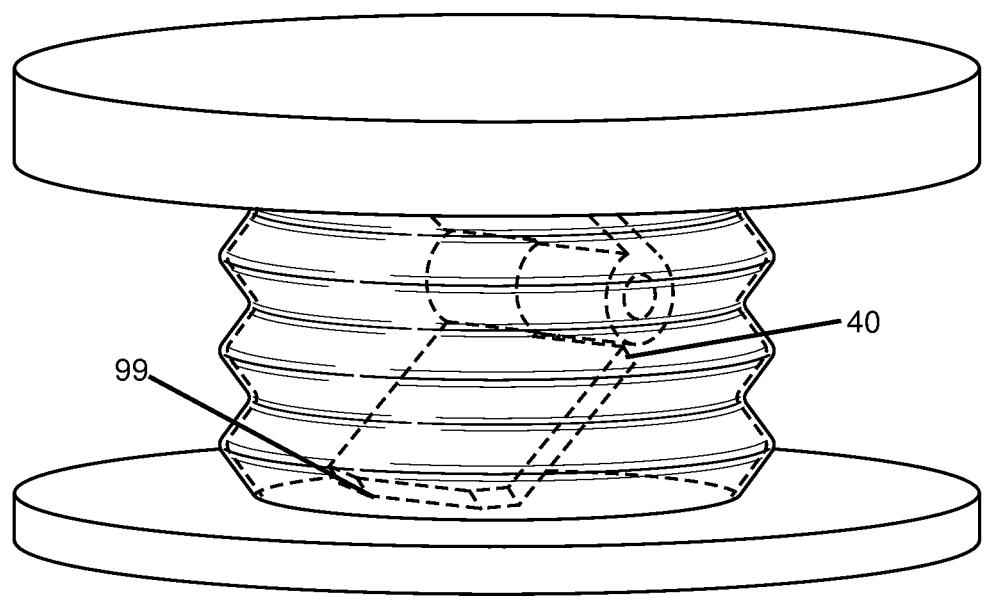
FIG. 14 shows a rotating hinge within the collapsible device of FIG. 11.
Figure 15:
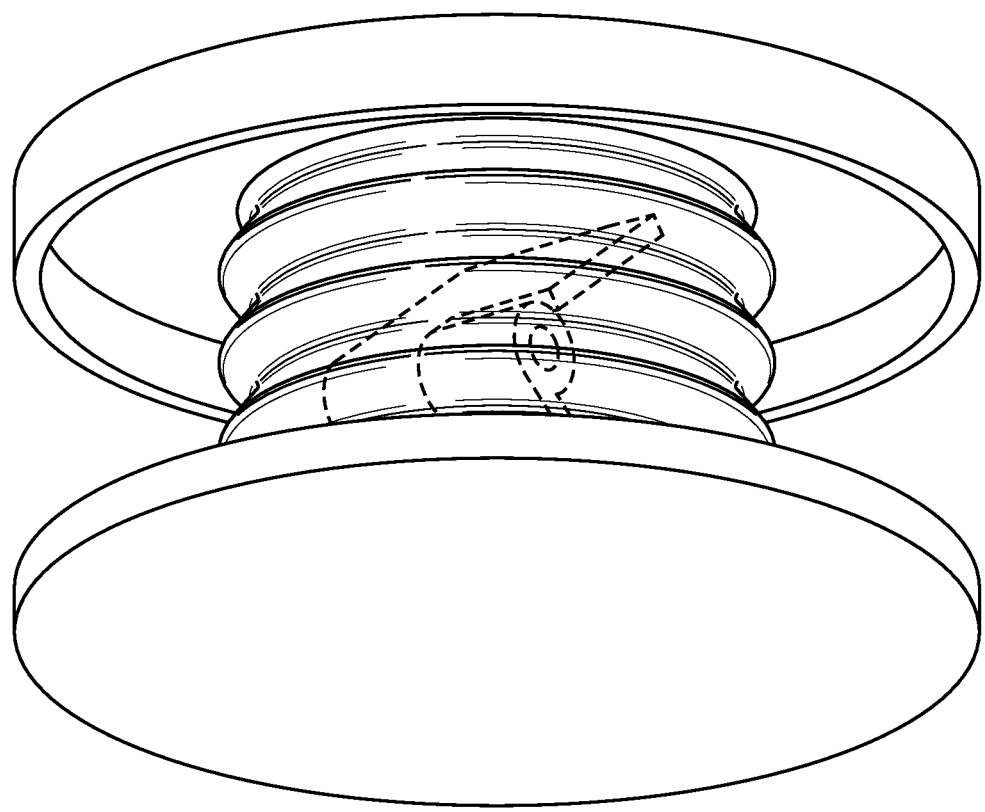
FIG. 15 shows a rotating hinge within the collapsible device of FIG. 12.
Figure 16:
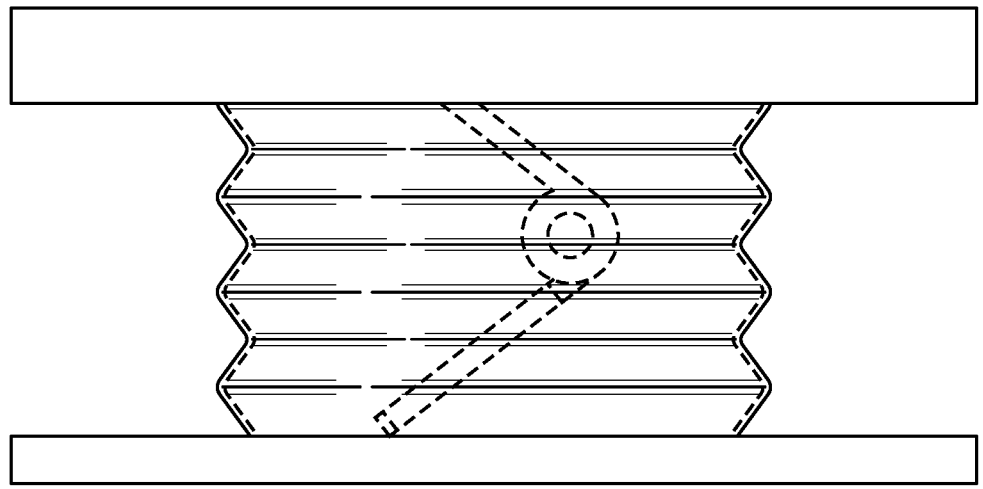
FIG. 16 shows a side elevation view of the collapsible device of FIG. 11.
Figure 17:
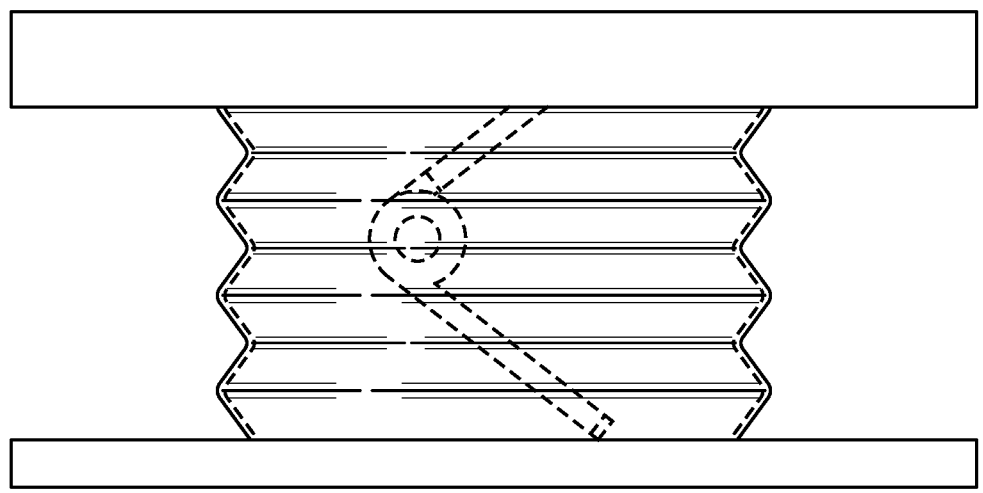
FIG. 17 shows a second side elevation view of the collapsible device of FIG. 11.
Figure 18:
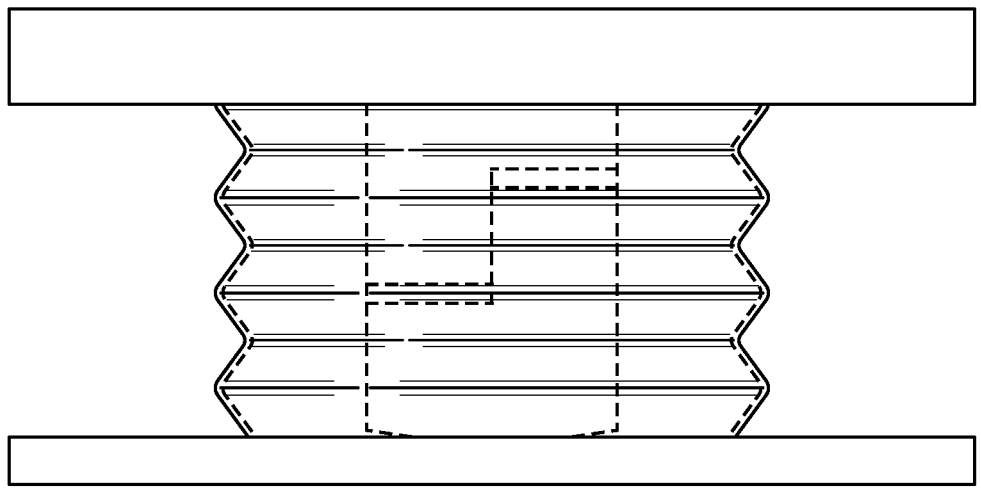
FIG. 18 shows a third side elevation view of the collapsible device of FIG. 11.
Figure 19:
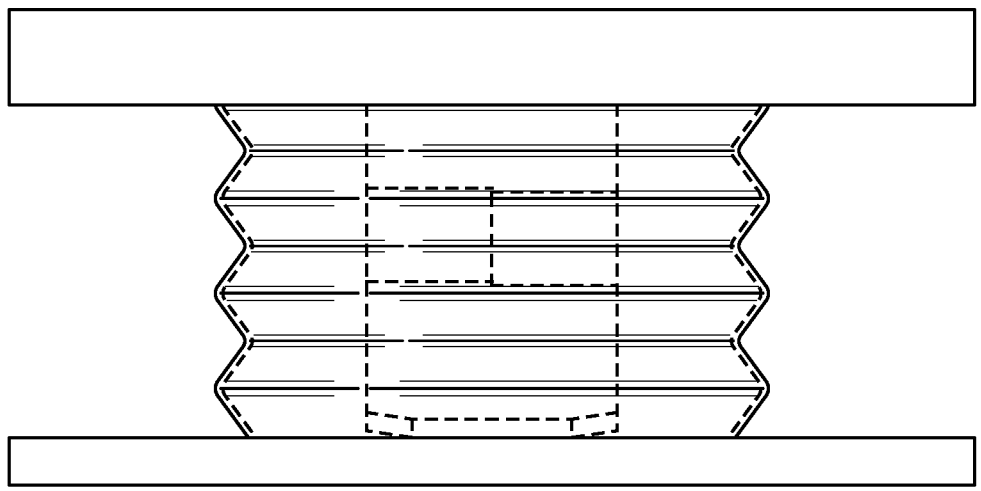
FIG. 19 shows a fourth side elevation view of the collapsible device of FIG. 11.
Figure 20:
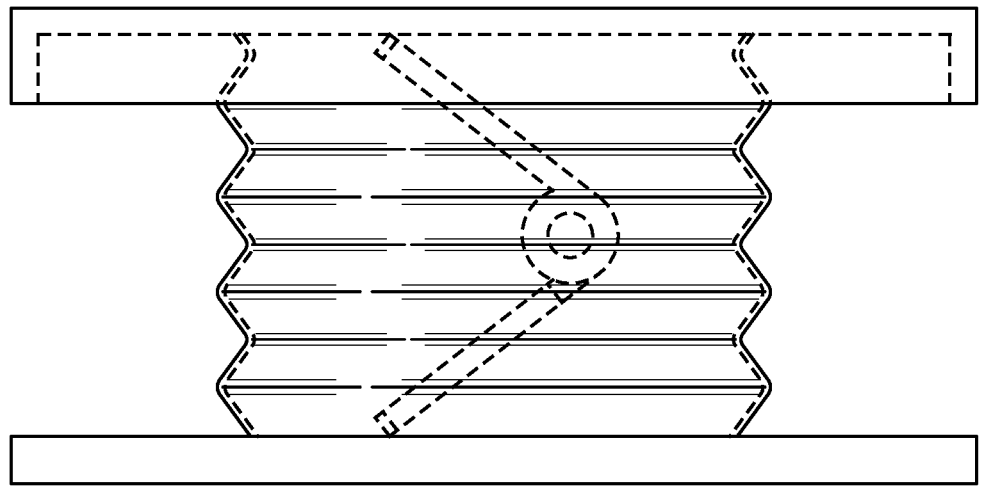
FIG. 20 shows a side elevation view of the collapsible device of FIG. 11 in an expanded configuration.
Figure 21:
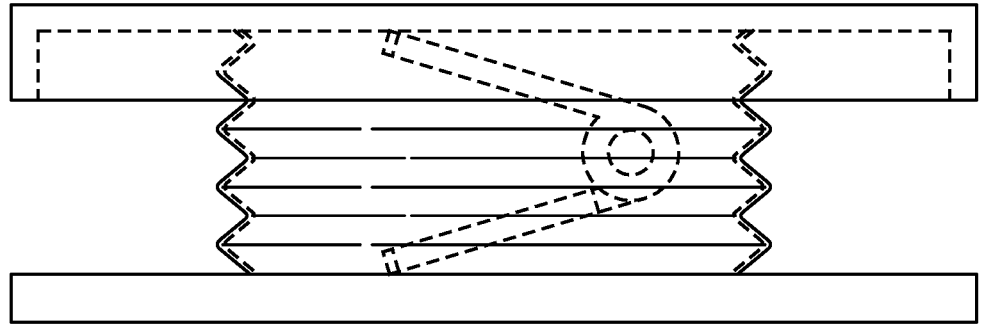
FIG. 21 shows a side elevation view of the collapsible device of FIG. 11 in a partially collapsed expanded configuration.
Figure 22:
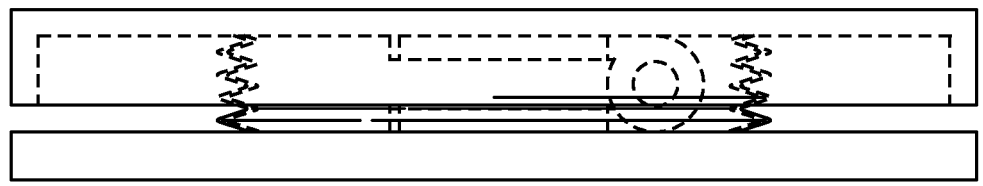
FIG. 22 shows a side elevation view of the collapsible device of FIG. 11 in a collapsed configuration.
Figure 23:
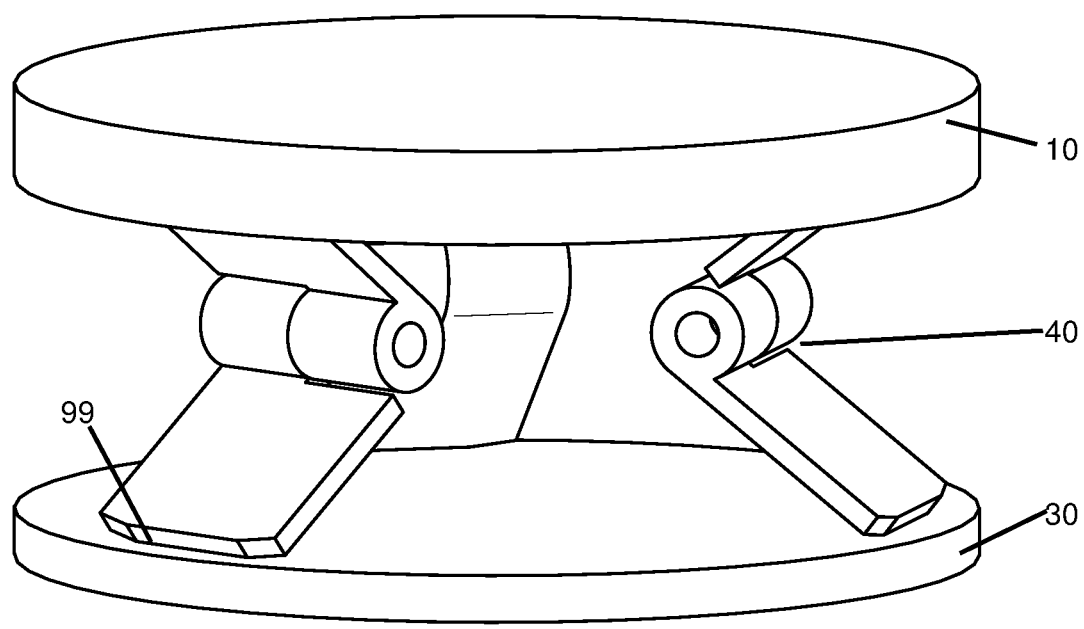
FIG. 23 shows a top and side perspective view of a collapsible device with three rotatable hinges.
Figure 24:
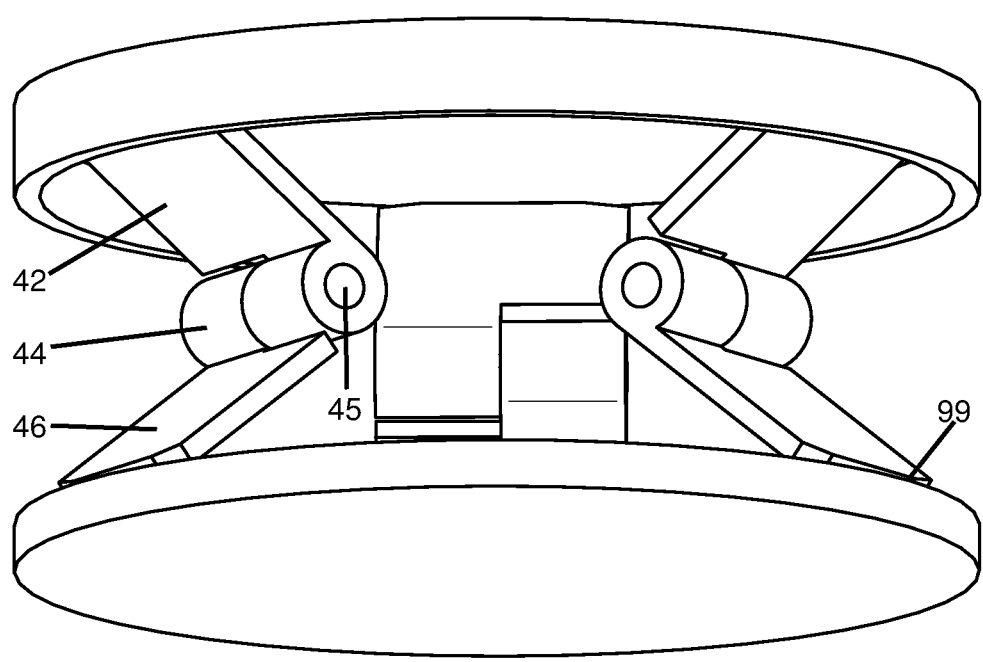
FIG. 24 shows a bottom and side perspective view of the collapsible device of FIG. 23.
Figure 25:
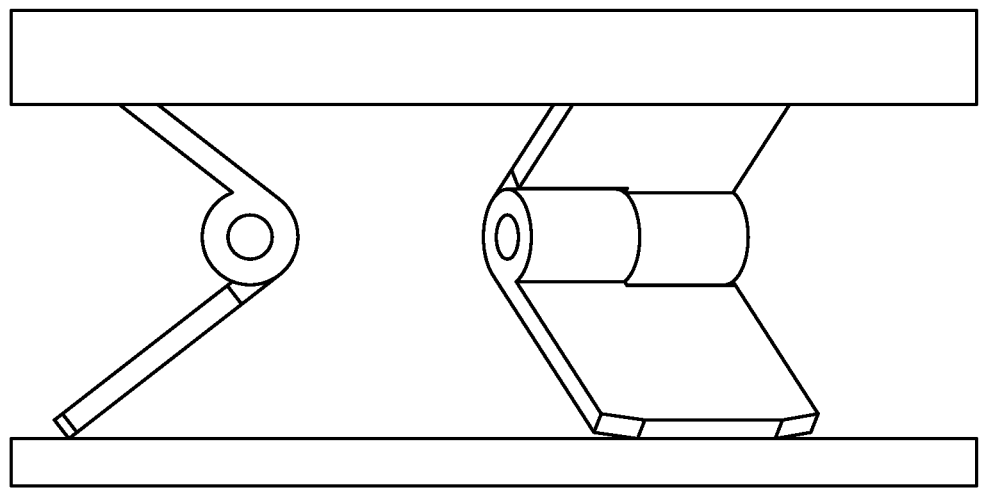
FIG. 25 shows a side elevation view of the collapsible device of FIG. 23.
Figure 26:
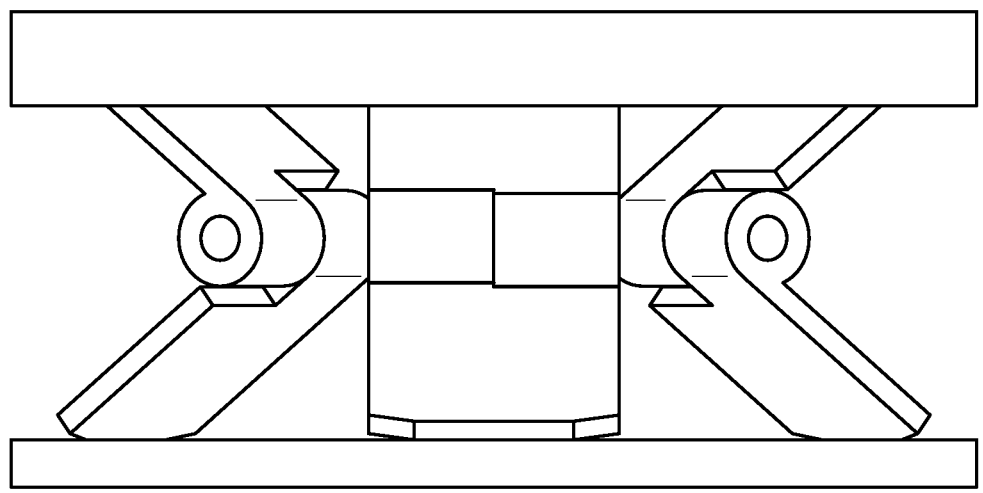
FIG. 26 shows a second side elevation view of the collapsible device of FIG. 23.
Figure 27:
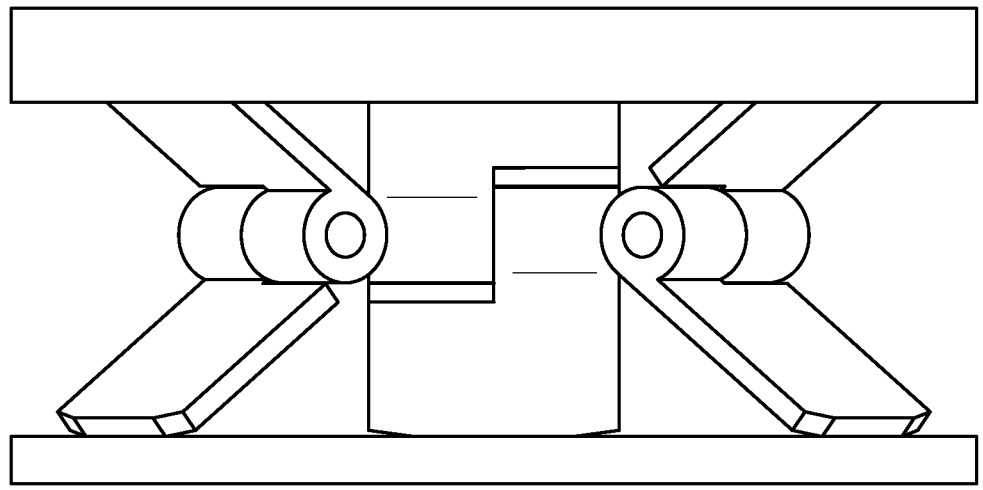
FIG. 27 shows a third side elevation view of the collapsible device of FIG. 23.
Figure 28:
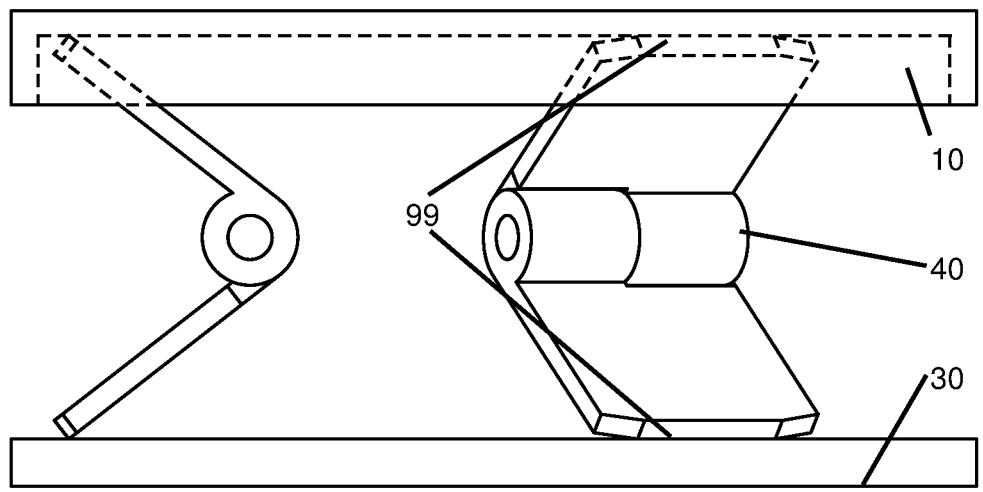
FIG. 28 shows a side elevation view of the collapsible device of FIG. 23 in an expanded configuration.
Figure 29:
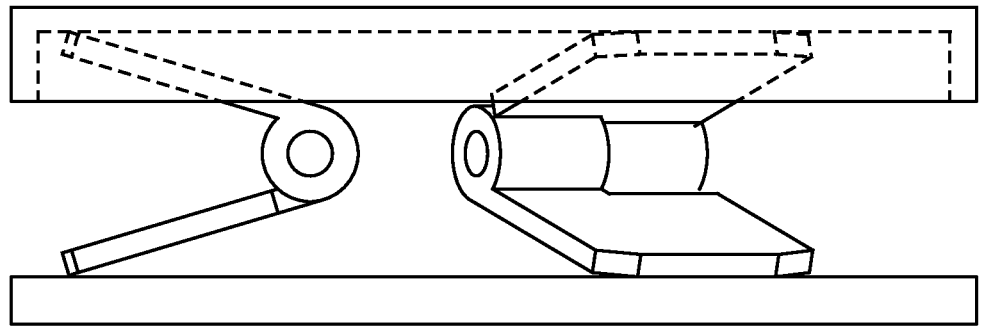
FIG. 29 shows a side elevation view of the collapsible device of FIG. 23 in a partially collapsed expanded configuration.
Figure 30:
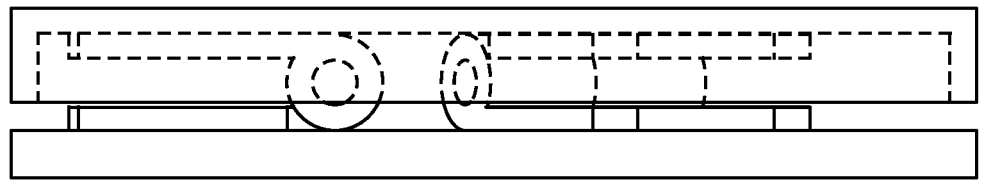
FIG. 30 shows a side elevation view of the collapsible device of FIG. 23 in a collapsed configuration.

As seen in FIG. 9, the extreme ends of the planar sections of each of the top section 44 and bottom section 46 of the hinge are connected via a living hinge with the respective top disc 10 and bottom disc 30. In FIG. 10, as the top and bottom discs are pushed closer together, the angle between the living hinge and each disc becomes more acute as does the angle between each top and bottom section (the planar parts thereof) of the rotating hinge. In FIG. 11, the the top disc 10 and bottom disc 30 are fully collapsed towards each other such that the cover 20 is folded over itself, the top and bottom portions 42 and 46 of the rotatable hinge 40 are in parallel to one another. The cylindrical region 44 with a pin 45 are equi-distant between each top 44 and 46 bottom part of the rotatable hinge 40 as well as between the top disc 10 and bottom disc 30, all of which are in parallel to each other in embodiments of the disclosed technology in the collapsed configuration. In the expanded configuration (FIG. 9) the top and bottom sections 42 and 46 of the rotatable hinge 40 are at acute angles to the discs 10 and 30 and each other in embodiments of the disclosed technology.

Referring now to FIGS. 12 through 22, in this embodiment the elements are as described with respect to FIGS. 1 through 11 except that the cover is resilient. Such a cover 22 can be a plastic cover which folds over itself and retains it's shape in a folded or unfolded configuration. The cover can fold with alternating sections which extend inwards and outwards being pressed towards each other such that every section is moved towards or becomes parallel and/or touches each the next such section. A "section" of the cover is one which extends in a same direction before turning abruptly in another direction.

FIGS. 23 through 30 show an embodiment with three rotatable hinges. Instead of a single hinge which is centered (at the living hinge, at a middle of a horizontal length of the hinge, or centered at the pin), the hinges 40 are spaced such that a connecting end at the living hinges 99 are closer to edge of a respective disc in an embodiment of the disclosed technology. The connection point can be within 20% of the way to an edge, measured from the diameter of the disc. The hinges can fold outwards, as shown (meaning that the opening between the top and bottom portions of the rotatable hinge 40 face outwards away from each other and away from a center point of the hinges) or inwards (opposite of outwards). The hinges can be arranged equi-distant from a center point or center vertical line which passes through a midpoint of each disc 10 and 30. The hinges 40 can be arranged such that they are equi-spaced from a next such hinge 40 in a circular or regular polygonal configuration when measuring at attachment points along the living hinge 99 or elsewhere.

Referring to all of the embodiments simultaneously, the devices can be procured out of two molds and a pin or other frictional device which connects between rotatable hinges or rotatable hinge parts. The two molds can be identical or substantially identical (e.g. but for a lip or depth of a disc). Thus, a mold can be used to create a disc and part of a rotatable hinge such as disc 10 and rotatable hinge upper part 42. Another mold can be used to create disc 30 and rotatable hinge lower part 46. The living hinge is created by using a thinner section at the living hinge 99 such that the disc and rotatable hinge part are rotatable with respect to one another. When the connects the rotatable hinge upper 42 and lower 46 to each other by way of a pin 45. A cover 20 or 22 can then be added. This same manner of construction can be used where multiple rotatable hinges 40 are used.

Figure 31:
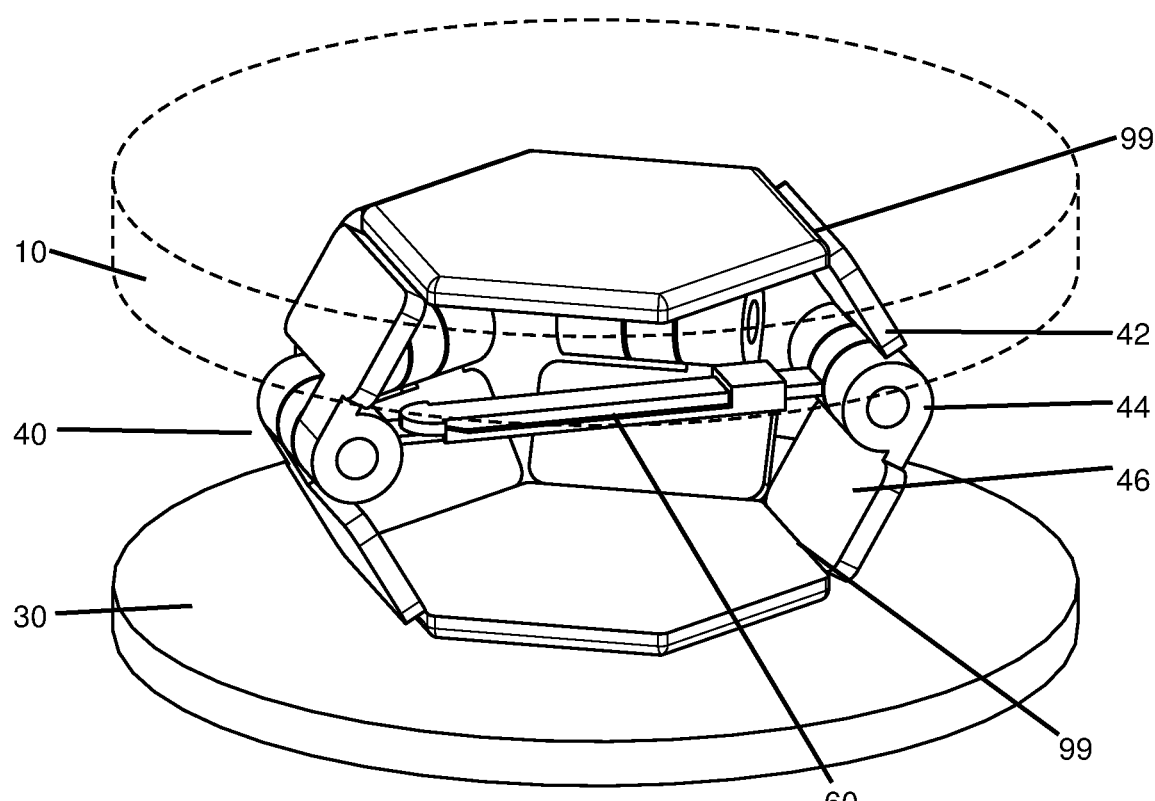
FIG. 31 shows a perspective view of a collapsible device with multiple rotatable hinges in an embodiment of the disclosed technology.
Figure 32:
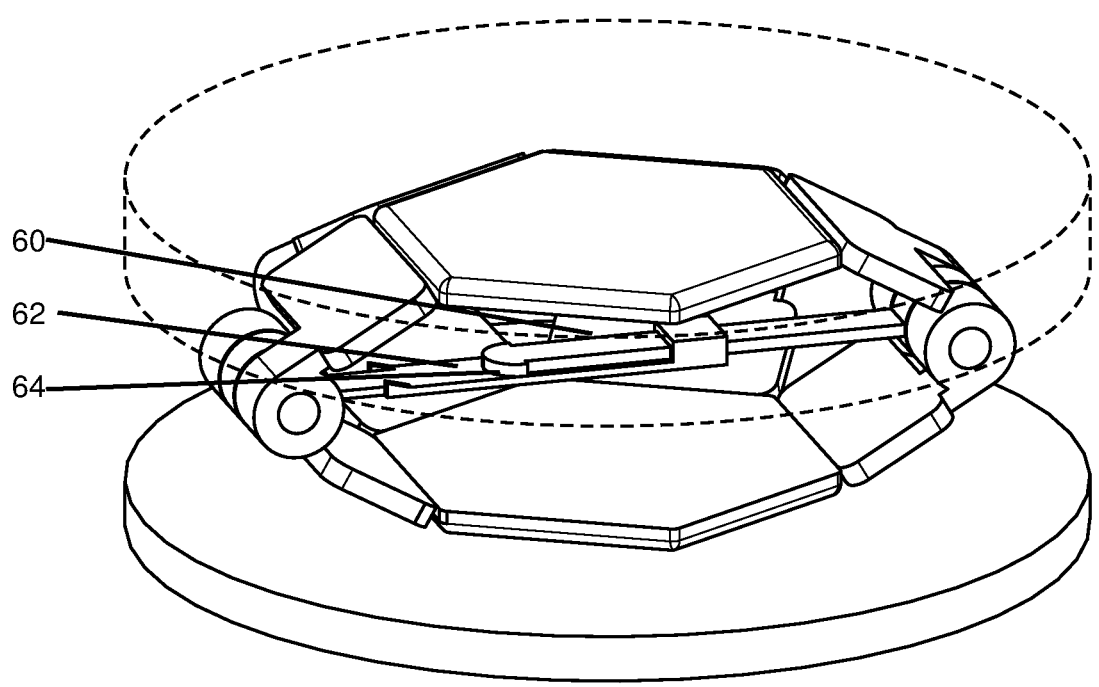
FIG. 32 shows a perspective view of a partially collapsed collapsible device of FIG. 31.
Figure 33:
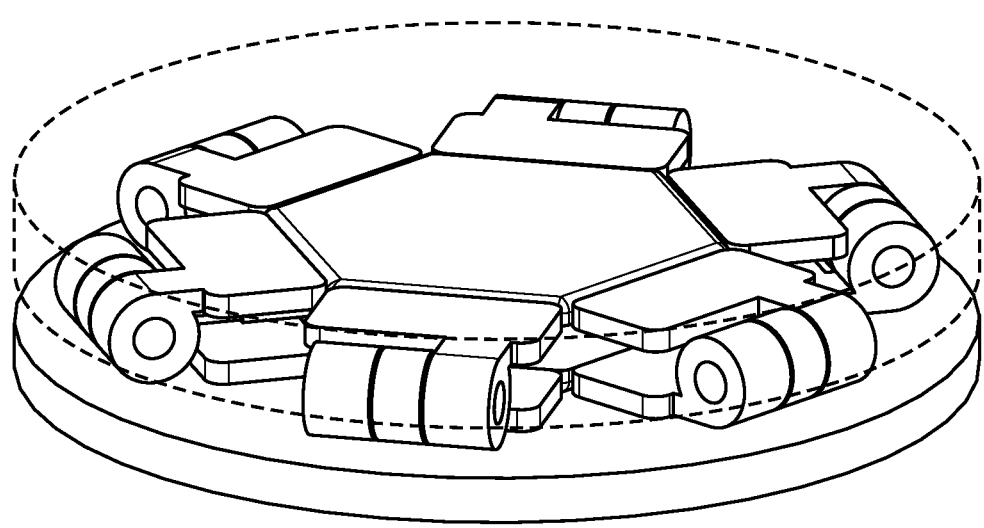
FIG. 33 shows a perspective view of a fully collapsed collapsible device of FIG. 31.

FIGS. 31, 32, and 33 show a version of a collapsible device of embodiments of the disclosed technology with multiple rotatable hinges. In the expanded state (FIG. 31) the elements shown are the same as found in FIGS. 1-30 with the addition of a friction bar 60. The friction bar 60 has a male flange 64 and female flange 62 which push passed each other such that a portal of the female flange is filled with and frictionally hinders (makes movement more difficult through the use of friction) movement of the male flange into and out of the portal. This can be in addition to the hinged mid-region 44 of the rotatable hinges 40 frictionally hindering movement of one or more of the rotatable hinges 40.

Each rotatable hinge 40 can be connected at a top and bottom side at a living hinge to a top disc 10 and bottom disc 30. Note also that the hinges 40 can be arranged around a center point or center line, in this case, a vertical line which passes through the middle of the hexagonal structure seen just interior to the top and bottom discs. Note that this hexagonal structure or any other layer or material situated between the discs (10 and 30) and a hinge 40 or hinges 40 (depending on embodiment), for purposes of the claims, unless otherwise specified, is construed as being part of the respective adjacent disc. The hinges 40 in the embodiment shown are arranged in a polpolygonal, and further, a regular polygonal orientation or configuration with respect to one another. The hinges further cover a majority or substantially all of a space enclosed between the hinges in embodiments of the disclosed technology. Note also that hinges can face inwards (FIG. 31) or outwards (FIG. 25) with respect the center vertical line where the direct of facing is defined as where an acute angle is formed when the hinge collapses and the discs 10 and 30 are moved closer together.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A collapsible device, comprising:
a rotating hinge with a top section and bottom section;
a top circular disc connected via a first living hinge to said top section; and
a bottom circular disc connected via a second living hinge to said bottom section;
wherein a frictional pin connects to each of said top section and said bottom section and hinders movement of said top section and said bottom section relative to one another.

2. The collapsible device of claim 1, wherein a horizontal line of symmetry in said rotating hinge passes through a frictional section of said rotating hinge.

3. The collapsible device of claim 2, wherein at said frictional section, said top section and said bottom section frictionally rotate with respect to one another.

4. The collapsible device of claim 1, wherein said rotating hinge is adjustable between:
a first condition where said top section and said bottom section are in parallel to one another and a longest length of each of said top circular disc and said bottom circular disc;
a second condition where said top section and said bottom section are at acute angle to one another.

5. The collapsible device of claim 4, wherein an exterior cover surrounds said rotating hinge and prevents said top section and said bottom section from becoming inline with each other due to taut stretching of said exterior cover.

6. The collapsible device of claim 5, wherein said exterior cover folds uniformly in said first condition and expands with an alternating diagonal exterior in said second condition.

7. The collapsible device of claim 5, wherein said rotating hinge is surrounded by a non-resilient cover which is connected to each of said top circular disc and said bottom circular disc.

8. The collapsible device of claim 4, wherein said frictional pin and each said first and said second living hinge cause said collapsible device in said second condition to remain in said second condition when said collapsible device is left to rest.

9. A collapsible device, comprising:
a rotating hinge with a top section and bottom section;
a top circular disc connected via a first living hinge to said top section;
a bottom circular disc connected via a second living hinge to said bottom section; and
a plurality of rotating hinges, each with a respective said top portion and said bottom portion;
wherein said plurality of rotating hinges are equidistant from a center point between said plurality of rotating hinges and are equi-spaced in a circular formation.

10. The collapsible device of claim 9, wherein said plurality of rotating hinges fold such that an acute angle between each respective said top section and said bottom section faces away from said center point.

11. The collapsible device of claim 10, wherein said plurality of rotating hinges fold such that an acute angle between each respective said top section and said bottom section faces towards said center point.

12. The collapsible device of claim 11, wherein said plurality of rotating hinges create an enclosed space therebetween.

13. The collapsible device of claim 12, wherein said plurality of rotating hinges is at least six rotating hinges arranged in polygonal configuration.

14. The collapsible device of claim 11, wherein a sliding frictional mechanism extends between two of said plurality of rotating hinges and hinders movement of said top circular disc and said bottom circular disc relative to one another.

15. A collapsible device, comprising:
   a rotating hinge with a top section and bottom section;
   a top circular disc connected via a first living hinge to said top section; and
   a bottom circular disc connected via a second living hinge to said bottom section;
   wherein said top section of said rotating hinge, said top circular disc, and said first living hinge are formed simultaneously and as a first unitary piece.

16. The collapsible device of claim 15, wherein said bottom section of said rotating hinge, said bottom circular disc, and said second living hinge are formed simultaneously and as a second unitary piece; and
   said first unitary piece and said second unitary piece are substantially identical.

17. The collapsible device of claim 16, wherein said rotating hinge is a plurality of rotating hinges which are joined by a pin.

\* \* \* \* \*